Oct. 10, 1961 R. TEMPLE ET AL 3,003,235
CABLE CUTTING TOOL
Filed June 3, 1960 2 Sheets-Sheet 1

INVENTORS.
ROBERT TEMPLE.
ERNEST E. TEMPLE.
BY
their
ATTORNEYS.

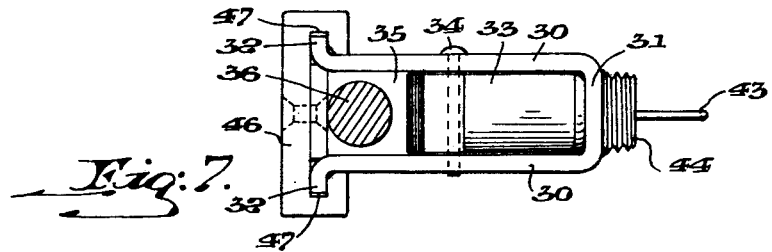
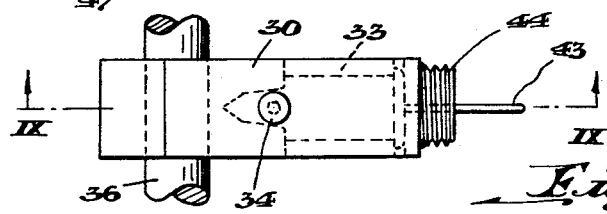
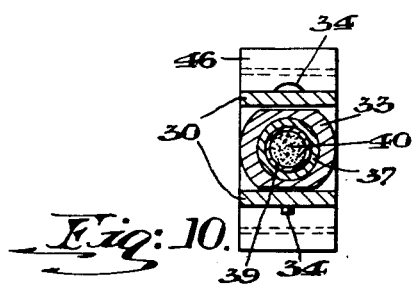
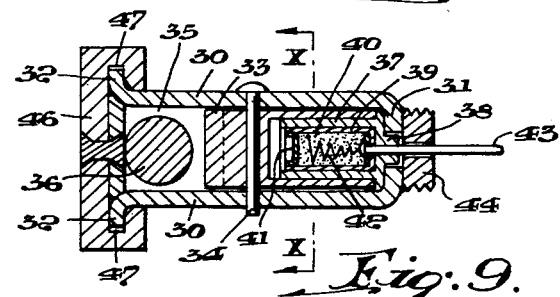
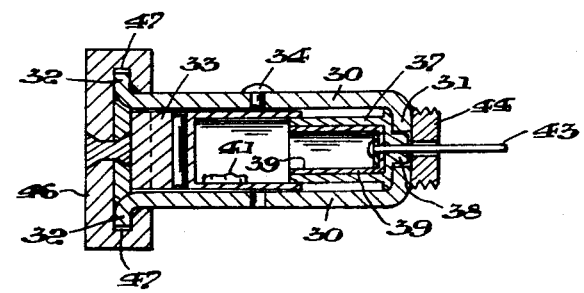

United States Patent Office 3,003,235
Patented Oct. 10, 1961

3,003,235
CABLE CUTTING TOOL
Robert Temple, Swissvale, and Ernest E. Temple, Murrysville, Pa., assignors to Mine Safety Appliances Company, a corporation of Pennsylvania
Filed June 3, 1960, Ser. No. 33,710
5 Claims. (Cl. 30—180)

This invention relates to tools for cutting chains and cables, and more particularly to tools small and light enough to be carried in a pocket.

It is among the objects of this invention to provide such a cutting tool, which is extremely small and light weight, which is very compact, which is simple and inexpensive in construction, which can be fired electrically, which can be quickly locked on the cable or chain that it is to cut, which is quiet in operation, and which can be used under water at the deepest depth to which a diver can go.

In accordance with this invention, the cutting tool has a frame provided at one end with a cable-receiving recess with an open side. A chisel is slidably mounted in the frame and has a cutting edge that is movable across the recess to cut a cable. Mounted on the frame is means for normally closing the open side of the cable recess to lock the tool on a cable therein. This locking means is slidable away from the recess to open it for reception of the cable. The chisel is driven forward by means of an explodable device that is mounted in the frame behind the chisel. The recess-closing means may be permanently mounted on the frame or removable from it.

The invention is illustrated in the accompanying drawings, in which

Figure 1:
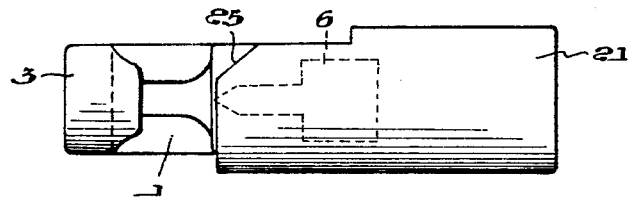
Figure 2:
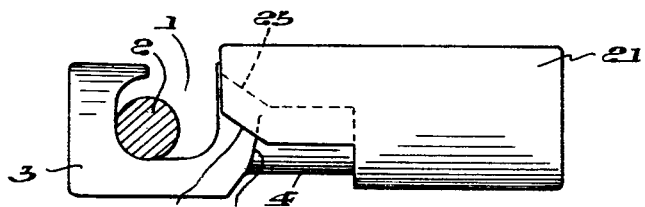
Figure 3:
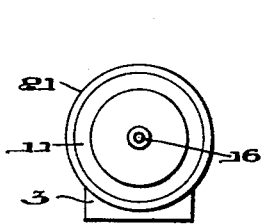
Figure 4:
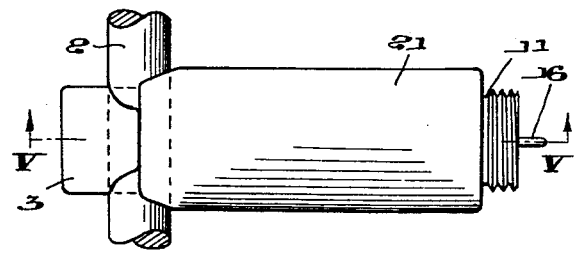
Figure 5:
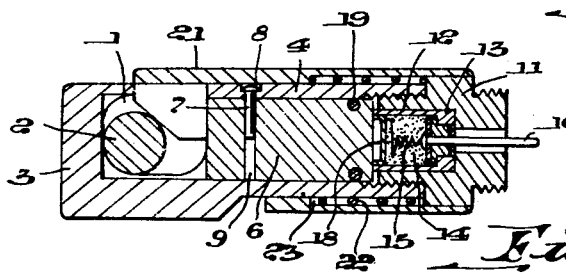
Figure 6:
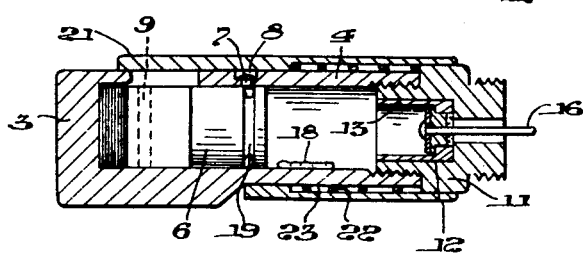

FIG. 1 is a plan view of one form of our tool open and ready to receive a cable;
FIG. 2 is a side view of the tool with a cable in its recess;
FIG. 3 is a view of the right-hand end of the tool;
FIG. 4 is a plan view of the tool locked on a cable;
FIG. 5 is a longitudinal section of the tool taken on the line V—V of FIG. 4;
FIG. 6 is a sectional view similar to FIG. 5, but showing the tool after it has been fired;
FIG. 7 is a side view of a modification locked on a cable;
FIG. 8 is a plan view thereof;
FIG. 9 is a longitudinal section taken on the line IX—IX of FIG. 8;
FIG. 10 is a transverse section taken on the line X—X of FIG. 9; and
FIG. 11 is a sectional view similar to FIG. 9, but showing the tool after it has been fired.

Referring to the first six figures of the drawings, a cable cutting tool frame is formed from a short metal block, which is hook-shape at its front end to form an open sided recess 1 that can receive a chain link or cable 2 that is to be cut by the tool. The hook portion 3 of the frame may have flat parallel sides, but the rest of the frame is cylindrical and is provided with a longitudinal bore to form a barrel 4. The front end of the barrel opens into the back side of the recess.

Slidably mounted in the barrel is a chisel 6 which, as shown in FIG. 6, has a cylindrical rear portion, a thinner rectangular central portion and a tapered front end portion provided with a cutting edge. As shown in FIG. 5, the chisel normally is held in the barrel, with its cutting edge beside the cable recess, by means of a shear pin 7 extending through a countersunk hole 8 in the side of the barrel and into a passage 9 through the chisel.

The inside of the rear end of the barrel behind the chisel is threaded and receives a breechblock 11 that projects axially and radially from the barrel. The breechblock is provided with a forwardly opening chamber 12, in which a high pressure explodable device is mounted. Preferably, this is an electrically fired cartridge 13, which contanis explosive powder 14 that is detonated by a heater wire 15 connected to a pin 16 extending from the cartridge back through the rear end of the breechblock. The back of the breechblock is threaded for receiving an electrical connector (not shown), so that the cartridge can be connected into an electric circuit. The front end of the cartridge is sealed by a cap 18 that prevents the powder from becoming wet when the tool is used under water. The rear end portion of the chisel may be provided with a peripheral groove containing a sealing ring 19 which, by sealing the gases behind the chisel, reduces noise and/or concussion when the tool is used above or under water.

It is a feature of this invention that the tool can be locked onto a cable that is to be cut. This is done by means of a retaining member 21 that is slidable and rotatably mounted on the barrel. The rear portion of the retaining member is a sleeve that encircles the barrel and breechblock, but the front portion is substantially semi-cylindrical so that it can extend forward over hook 3 and part or all of the way across the cable recess as shown in FIGS. 4, 5 and 6. To normally hold the retaining member in its forward recess-closing position, it is urged forward by a coil spring 22 that encircles the barrel in a groove 23 in the inside of the rear end of the retaining member. The spring is compressed between the front end of the groove and the radially projecting portion of breechblock 11. Therefore, as shown in FIGS. 4 and 5, it is possible to attach the tool to a cable with the assurance that it will not become dislodged before the tool is fired.

It is desirable that means be provided for holding the retaining member in retracted position before or while the tool is being applied to a cable. For this purpose the two front corners of retaining member 21 are cut off at an angle to provide diagonal surfaces 25, so that when the retaining member is retracted on the barrel and rotated in either direction, as shown in FIGS. 1 and 2, one of the surfaces 25 will engage and be pressed forward by the spring against a shoulder 26 formed between each side of hook 3 and the barrel. The shoulders therefore serve as stops to hold the retaining member retracted when desired. As soon as the retracted member is rotated slightly and released, the spring will drive it forward to close the open side of cable recess 1.

In operation, retaining member 21 is pulled back on the barrel 4 and rotated so that one diagonal surface 25 will engage an adjoining shoulder 26 and thereby prevent the retaining member from moving forward again. The cable recess 1 then is open so that the tool can be hooked over a cable that is to be cut. As soon as that is done, the retaining member is turned back far enough to release it from the shoulder and then it is released to permit spring 22 to push it forward across the recess as shown in FIGS. 4 and 5. The tool then can be fired at any time to drive the chisel through the cable and sever it against the front wall of recess 1, which serves as an anvil.

In the modification shown in FIGS. 7 to 11, the cable cutting tool is made from two pieces that can be separated from each other. The frame of the tool is made from a flat metal bar that is bent into U-shape to provide parallel side walls 30 connected by a rear end wall 31, with the front ends 32 of the side walls bent outward away from each other. Slidably disposed between the side walls is a chisel 33 that has a generally cylindrical body with opposite flattened sides engaging the side walls of the frame. In front of its cylindrical body the chisel is narrow and rectangular and then tapers forward to a cutting edge in the same general way as the chisel first described. The chisel is considerably shorter than the frame and normally is spaced from the front or open end of the frame by means of a shear pin 34 that extends through the opposite sides of the frame and the chisel. The space in the frame in front of the chisel forms a recess 35 for receiving a chain link or a cable 36 that is to be cut.

The body of the chisel is hollow and fits around a hollow breechblock 37 that engages the end wall 31 of the frame. The rear end of the breechblock is provided with a neck 38 that extends into a hole in the center of the end wall to prevent the chisel from pivoting on the shear pin. Inside the breechblock there is a high pressure, explodable device which is in the form of a cartridge 39. Inside the cartridge there is a charge of explosive powder 40, held in place by a sealing disc 41, that can be fired preferably by an electric resistance wire 42 connected to a pin 43 extending back through the breechblock neck and a threaded collar 44 secured to the outside of end wall 31. An electrical connector (not shown) can be screwed onto the collar to connect the cartridge in an electric circuit for firing the cartridge.

In order to lock the tool on a cable and also to form an anvil for the chisel to strike, a retaining member 46 is removably mounted on the front end of the frame. This member closes the open front end of recess 35 and has rearwardly projecting end portions provided with opposed parallel slots 47, so that it can be slid lengthwise of the slots onto the out-turned ends 32 of the frame. The frame and retaining member fit together tightly enough to prevent them from separating accidentally. Preferably, the retaining member has a central portion that projects a short distance into the space between the ends of the frame to insure that those ends will be held apart the desired distance at all times.

To use this tool, retaining member 46 is slid sideways off the front end of the frame, and a cable is inserted in recess 35. Then the retaining member is applied to the frame again as shown in the drawings. When the explodable device is detonated, the pressure builds up behind the chisel until the shear pin is broken, and then the chisel is driven forward through the cable and against the retaining member. The connection between the chisel and cartridge 39 helps to guide the chisel in a straight line.

The tools disclosed herein can be used in very restricted areas. For example, in cutting a chain, two tools can be used, one on each side of the same link. The tools are so inexpensive that they are expendable after a single use, but there is nothing to prevent them from being reloaded and used over and over again.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated an described.

We claim:

1. A cable cutting tool comprising a frame having a front end provided with a laterally opening cable-receiving recess, the rest of the frame including a barrel having a front end that opens into said recess, a chisel slidably mounted in the barrel and having a front cutting end movable across the recess, a retaining member surrounding the frame and slidably mounted thereon, a coil spring surrounding the frame and normally holding said member across the open side of the recess to lock the tool on a cable, said spring being compressible to permit the retaining member to be retracted to open said side of the recess, and an explodable device disposed in the rear end of the frame behind the chisel for driving it forward.

2. A cable cutting tool comprising a frame having a front end provided with a laterally opening cable-receiving recess, the rest of the frame including a barrel having a front end that opens into said recess, a chisel slidably mounted in the barrel and having a front cutting end movable across the recess, a retaining member slidably and rotatably mounted on the barrel, a coil spring surrounding the frame and urging said member forward to close the open side of the recess, said member being retractable on the barrel to open said side of the recess, the frame being provided with a stop engageable by the retracted retaining member when it is turned to a predetermined position on the barrel to hold said member retracted, and an explodable device disposed in the rear end of the frame behind the chisel for driving it forward.

3. A cable cutting tool comprising a frame having a front end provided with a laterally opening cable-receiving recess, the rest of the frame including a barrel having a front end that opens into said recess, a chisel slidably mounted in the barrel and having a front cutting end movable across the recess, a retaining member slidably and rotatably mounted on the barrel, a coil spring surrounding the frame and urging said member forward to close the open side of the recess, said member being retractable on the barrel to open said side of the recess, the frame and retaining member being provided with cooperating shoulders that hold said member retracted when it is turned to a predetermined position on the barrel, whereby to hold said member retracted, and an explodable device disposed in the rear end of the frame behind the chisel for driving it forward.

4. A cable cutting tool comprising a frame having a front end provided with a laterally opening cable-receiving recess, the rest of the frame being a barrel having a front end that opens into said recess, a breechblock screwed into the rear end of the barrel and projecting radially beyond it, a chisel slidably mounted in the barrel and having a front cutting end movable across said recess, a retaining member slidably mounted on the barrel and breechblock, the inside of said member being provided with a forwardly extending circumferential groove, a coil spring in said groove compressed between the breechblock and the front end of the groove and normally holding said member across the open side of the recess to lock the tool on a cable, said spring being compressible to permit the retaining member to be retracted to open said side of the recess, and an explodable device disposed in the rear end of the frame behind the chisel for driving it forward.

5. A cable cutting tool comprising a frame having a front end provided with a laterally opening cable-receiving recess, the rest of the frame including a cylindrical barrel having a front end that opens into said recess, a chisel slidably mounted in the barrel and having a front cutting end movable across the recess, a retaining member slidably and rotatably mounted on the barrel and normally extending across the open side of said recess to lock the tool on a cable, said member being retractable on the barrel to open said side of the recess, a breechblock removably mounted in the rear end of the frame behind the chisel and provided with a forwardly opening chamber, a charge of explosive material in said chamber, and electrical connections with said charge for firing it to drive the chisel forward.

References Cited in the file of this patent

UNITED STATES PATENTS

| | | |
|---|---|---|
| 1,397,911 | Tossizza | Nov. 22, 1921 |
| 2,008,362 | Littlebale | July 16, 1935 |
| 2,716,813 | Smyres | Sept. 6, 1955 |
| 2,863,214 | Szappanyos | Dec. 9, 1958 |